(12) United States Patent
Lee et al.

(10) Patent No.: US 11,651,475 B2
(45) Date of Patent: May 16, 2023

(54) IMAGE RESTORATION METHOD AND DEVICE

(71) Applicant: SAMSUNG ELECTRONICS CO., LTD., Suwon-si (KR)

(72) Inventors: Seho Lee, Seoul (KR); Dong Kyung Nam, Yongin-si (KR); Seok Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 237 days.

(21) Appl. No.: 17/104,958

(22) Filed: Nov. 25, 2020

(65) Prior Publication Data
US 2022/0028039 A1  Jan. 27, 2022

(30) Foreign Application Priority Data
Jul. 24, 2020  (KR) .................. 10-2020-0092384

(51) Int. Cl.
G06T 5/00 (2006.01)
G06T 7/50 (2017.01)
G06T 3/00 (2006.01)
G06T 3/40 (2006.01)
G06T 7/557 (2017.01)

(52) U.S. Cl.
CPC ............ G06T 5/001 (2013.01); G06T 3/0093 (2013.01); G06T 3/4053 (2013.01); G06T 7/50 (2017.01); G06T 7/557 (2017.01); G06T 2207/10052 (2013.01); G06T 2207/20084 (2013.01)

(58) Field of Classification Search
CPC .............. H04N 13/111; G06T 15/205; G06T 2207/10052; G06T 7/50; G06T 7/55; G06T 7/557; G06T 7/593; G06T 7/596; G06T 7/30–38; G06T 3/0012; G06T 3/0068; G06T 3/0075; G06T 3/0093; G06T 3/20; G06T 3/60; G06T 2207/20081;
(Continued)

(56) References Cited

U.S. PATENT DOCUMENTS 10,453,220 B1   10/2019  Mihal et al.
2010/0026712 A1*  2/2010  Aliprandi ............... G06T 15/20
                                            345/629
2014/0092281 A1*  4/2014  Nisenzon ............... G06T 7/557
                                            348/262
(Continued)

FOREIGN PATENT DOCUMENTS

EP   3 624 049 A1   3/2020
EP   3 816 929 A1   5/2021
(Continued)

OTHER PUBLICATIONS

Wang, Qiang, et al. "FADNet: A Fast and Accurate Network for Disparity Estimation." arXiv preprint arXiv:2003v1.10758 (2020). (Year: 2020).*

(Continued)

Primary Examiner — Geoffrey E Summers
(74) Attorney, Agent, or Firm — Sughrue Mion, PLLC

(57) ABSTRACT

An image restoration device obtains input data including input image information for each viewpoint, and generates an output image from warped image information generated by warping the input image information using a global transformation information of each viewpoint and disparity information of each viewpoint, using an image restoration model.

18 Claims, 10 Drawing Sheets

(58) Field of Classification Search
CPC ......... G06T 2207/20084; G06T 3/4046; G06T 3/4053; G06T 5/001; G06N 3/02–088
See application file for complete search history.

(56) References Cited

U.S. PATENT DOCUMENTS

| | | |
|---|---|---|
| 2016/0071279 A1 | 3/2016 | Wu et al. |
| 2017/0180699 A1 | 6/2017 | El Choubassi et al. |
| 2019/0098283 A1 | 3/2019 | Filippov |
| 2019/0158799 A1 | 5/2019 | Gao et al. |
| 2019/0244379 A1 | 8/2019 | Venkataraman |
| 2019/0286921 A1 | 9/2019 | Liang et al. |
| 2020/0092475 A1 | 3/2020 | Meler et al. |

FOREIGN PATENT DOCUMENTS

| | | |
|---|---|---|
| KR | 10-2014-0088606 A | 7/2014 |
| KR | 10-2019-0000591 A | 1/2019 |
| KR | 10-2019-0053074 A | 5/2019 |
| KR | 10-2019-0071011 A | 6/2019 |

OTHER PUBLICATIONS

Liu, Guilin, et al. "Image Inpainting for Irregular Holes Using Partial Convolutions." European Conference on Computer Vision. Springer, Cham, 2018. (Year: 2018).*

Wu, Gaochang, et al. "Light field image processing: An overview." IEEE Journal of Selected Topics in Signal Processing 11.7 (2017): 926-954. (Year: 2017).*

Kalantari, Nima Khademi, Ting-Chun Wang, and Ravi Ramamoorthi. "Learning-based view synthesis for light field cameras." ACM Transactions on Graphics (TOG) 35.6 (2016): 1-10. (Year: 2016).*

Shi, Wenzhe, et al. "Real-Time Single Image and Video Super-Resolution Using an Efficient Sub-Pixel Convolutional Neural Network." 2016 IEEE Conference on Computer Vision and Pattern Recognition (CVPR). IEEE, 2016. (Year: 2016).*

Xintao Wang et al., "EDVR: Video Restoration with Enhanced Deformable Convolutional Networks", CVPR, 2019, pp. 1-10 (10 pages total).

Yulun Zhang et al., "Image Super-Resolution Using Very Deep Residual Channel Attention Networks", ECCV, 2018, pp. 1-16 (16 pages total).

Communication dated May 20, 2021 by the European Patent Office ion European Patent Application No. 20215976.0.

Gaochang Wu et al., "Spatial-Angular Attention Network for Light Field Reconstruction", Journal of Latex Class Files, vol. 14, No. 8, Aug. 2015, arXiv:2007.02252v1, [eess.IV], Jul. 5, 2020, XP081716314. (12 pages total).

Yu-Ju Tsai et al., "Attention-Based View Selection Networks for Light-Field Disparity Estimation", Proceedings of the Thirty-Fourth AAAI Conference On Artificial Intelligence (AAAI-20), vol. 34, No. 07, Jun. 18, 2020, pp. 12095-12103, XP055802205.

* cited by examiner

IMAGE RESTORATION METHOD AND DEVICE

CROSS-REFERENCE TO RELATED APPLICATION

This application claims priority to Korean Patent Application No. 10-2020-0092384, filed on Jul. 24, 2020, in the Korean Intellectual Property Office, the disclosure of which is incorporated by reference herein in its entirety.

BACKGROUND

1. Field

Methods and apparatuses consistent with example embodiments relate to image restoration.

2. Description of Related Art

The development of optical technology and image processing technology has led to the widespread use of an image capturing device in extensive fields of application, for example, multimedia contents, security, and object recognition. The image capturing device may be provided in a mobile device, a camera, a vehicle, a computer, or the like, to capture an image, recognize an object, or obtain data for controlling a device. A size of the image capturing device may be determined by the size of a lens, a focal length of a lens, the size of a sensor, and the like. To reduce the size of the image capturing device, a multi-lens including compact and small lenses may be used.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an image restoration method including obtaining input data including input image information for each of viewpoints, estimating a global transformation parameter of each of the viewpoints from the obtained input data, estimating disparity information of each of the viewpoints from the obtained input data, generating warped image information for each of the viewpoints by warping the input image information using the global transformation parameter and the disparity information, and generating an output image for the viewpoints from the generated warping image information using an image restoration model. In accordance with an aspect of the disclosure, an image restoration method includes obtaining input data including respective input image information for each of a plurality of viewpoints; estimating a respective global transformation parameter of each of the plurality of viewpoints based on the obtained input data; estimating respective disparity information of each of the plurality of viewpoints based on the obtained input data; generating respective warped image information for each of the plurality of viewpoints by warping the respective input image information using the respective global transformation parameter and the respective disparity information; and generating, using an image restoration model, an output image from the generated respective warped image information for each of the plurality of viewpoints.

The obtaining of the input data may include capturing a plurality of viewpoint images through a plurality of lenses arranged at different positions; and obtaining the respective input image information from the captured plurality of viewpoint images.

The obtaining of the respective input image information may include extracting, as the respective input image information, a respective input feature map from each of the plurality of viewpoint images using a feature extraction model.

The generating of the respective warped image information may include generating respective transformed image information by transforming the respective input image information into a pixel coordinate system of target image information corresponding to a target viewpoint, using the global transformation parameter; and generating the respective warped image information by correcting a disparity of the generated respective transformed image information with respect to the target image information, using the respective disparity information.

The transforming using the respective global transformation parameter may include warping all pixels of the respective input image information to the pixel coordinate system of the target image information, using a single depth corresponding to a reference disparity.

The warping may include calculating a coordinate in the respective input image information corresponding to a position in the pixel coordinate system of the target image information, using the global transformation parameter; obtaining a pixel value of the calculated coordinate in the respective input image information; and setting a pixel value of the position in the respective transformed image information equal to the obtained pixel value.

The generating of the respective warped image information may include generating a warped feature map by warping a feature map extracted from each of the plurality of viewpoint images.

The estimating of the respective global transformation parameter may include obtaining information in which a spatial dimension component is removed from the input data through a global pooling operation; and calculating the respective global transformation parameter based on the information in which the spatial dimension component is removed.

The calculating of the respective global transformation parameter may include applying, to the information in which the spatial dimension component is removed, an operation associated with at least one fully-connected layer of a convolutional neural network.

The estimating of the respective disparity information may include, for each pixel of a plurality of pixels in the respective viewpoint, estimating respective pixel disparity information by performing at least one convolution filtering on feature data extracted from the input data.

The estimating of the respective pixel disparity information may include calculating the respective pixel disparity information with a resolution identical to a resolution of the input data.

The image restoration model may include a neural network including at least one convolutional layer that applies convolution filtering to the input data.

The generating of the output image may include generating image information realigned by a single viewpoint by performing a pixel shuffle on pixels included in the respective warped image information; and generating the output image having a target resolution by applying the image restoration model to the generated realigned image information.

The input data may include a plurality of pixels, and the generating of the output image may include generating the output image without sensing a depth to a respective target point corresponding to each of the plurality of pixels.

A resolution of the output image may be greater than a respective resolution of each of the plurality of viewpoint images.

The obtaining of the input data may include capturing a multi-lens image including a plurality of viewpoint images by an image sensor comprising a multi-lens array; and generating the input data from the captured multi-lens image.

The obtaining of the input data may include capturing a plurality of viewpoint images, each of the plurality of viewpoint images being captured by a respective image sensor of a plurality of image sensors; and generating the input data from the captured plurality of viewpoint images.

A non-transitory computer-readable storage medium may store instructions that are executable by a processor to perform the image restoration method of an above-noted aspect of the disclosure.

In accordance with an aspect of the disclosure, an image restoration device includes a memory configured to store therein an image restoration model; and a processor configured to: obtain input data including respective input image information for each of a plurality of viewpoints, estimate a respective global transformation parameter of each of the plurality of viewpoints based on the obtained input data, estimate respective disparity information of each of the plurality of viewpoints based on the obtained input data, generate respective warped image information for each of the plurality of viewpoints by warping the respective input image information using the respective global transformation parameter and the respective disparity information, and generate, using the image restoration model, an output image from the generated respective warped image information for each of the plurality of viewpoints.

In accordance with an aspect of the disclosure, a camera device includes a lens array including a plurality of lenses, each of the plurality of lenses corresponding to a respective viewpoint of a plurality of viewpoints; a sensing array including a plurality of sensing elements configured to sense light passing through the lens array, the sensing array being divided into a plurality of sensing regions corresponding to the plurality of lenses; and a processor configured to obtain input data including respective input image information for each of the plurality of viewpoints, estimate a respective global transformation parameter of each of the plurality of viewpoints based on the obtained input data, estimate respective disparity information of each of the plurality of viewpoints based on the obtained input data, generate respective warped image information for each of the plurality of viewpoints by warping the respective input image information using the respective global transformation parameter and the respective disparity information, and generate, using an image restoration model, an output image from the generated respective warped image information for each of the plurality of viewpoints.

In accordance with an aspect of the disclosure, a mobile terminal includes an image sensor configured to capture a multi-lens image comprising a plurality of viewpoint images respectively corresponding to a plurality of viewpoints; a memory configured to store therein an image restoration model; and a processor configured to obtain input data including respective input image information for each of the plurality of viewpoints, estimate a respective global transformation parameter of each of the plurality of viewpoints based on the obtained input data, estimate respective disparity information of each of the plurality of viewpoints based on the obtained input data, generate respective warped image information for each of the plurality of viewpoints by warping the respective input image information using the respective global transformation parameter and the respective disparity information, and generate, using the image restoration model, an output image from the generated respective warped image information for each of the plurality of viewpoints In accordance with an aspect of the disclosure, an image restoration device includes a memory configured to store therein a warping model and an image restoration model; and a processor configured to obtain a plurality of input images, each input image corresponding to a respective viewpoint of a plurality of viewpoints; generate, using the warping model, a plurality of warped images based on the plurality of input images, each warped image corresponding to a respective input image of the plurality of input images; and generate, using the image restoration model, an output image based on the plurality of warped images.

The memory may be further configured to store a feature extraction model, and the processor may be further configured to generate, using the feature extraction model, a plurality of feature maps based on the plurality of input images, each feature map corresponding to a respective input image of the plurality of input images; and generate, using the warping model, the plurality of warped images based on the plurality of feature maps.

Each of the plurality of input images may include a respective plurality of pixels, and the processor may be further configured to generate, using the warping model, feature data based on the plurality of input images; generate, based on the feature data, a plurality of global transformation parameters, each global transformation parameter corresponding to a respective input image of the plurality of input images; generate, based on the feature data, a plurality of disparity values based on the feature data, each disparity value corresponding to a pixel of the respective plurality of pixels; and generate the plurality of warped images based on the plurality of global transformation parameters and based on the plurality of disparity values.

The warping model may include a first convolutional neural network (CNN) and the image restoration model may include a second CNN.

The warping model may include a first convolutional neural network (CNN), the image restoration model may include a second CNN, and the feature extraction model may include a third CNN.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
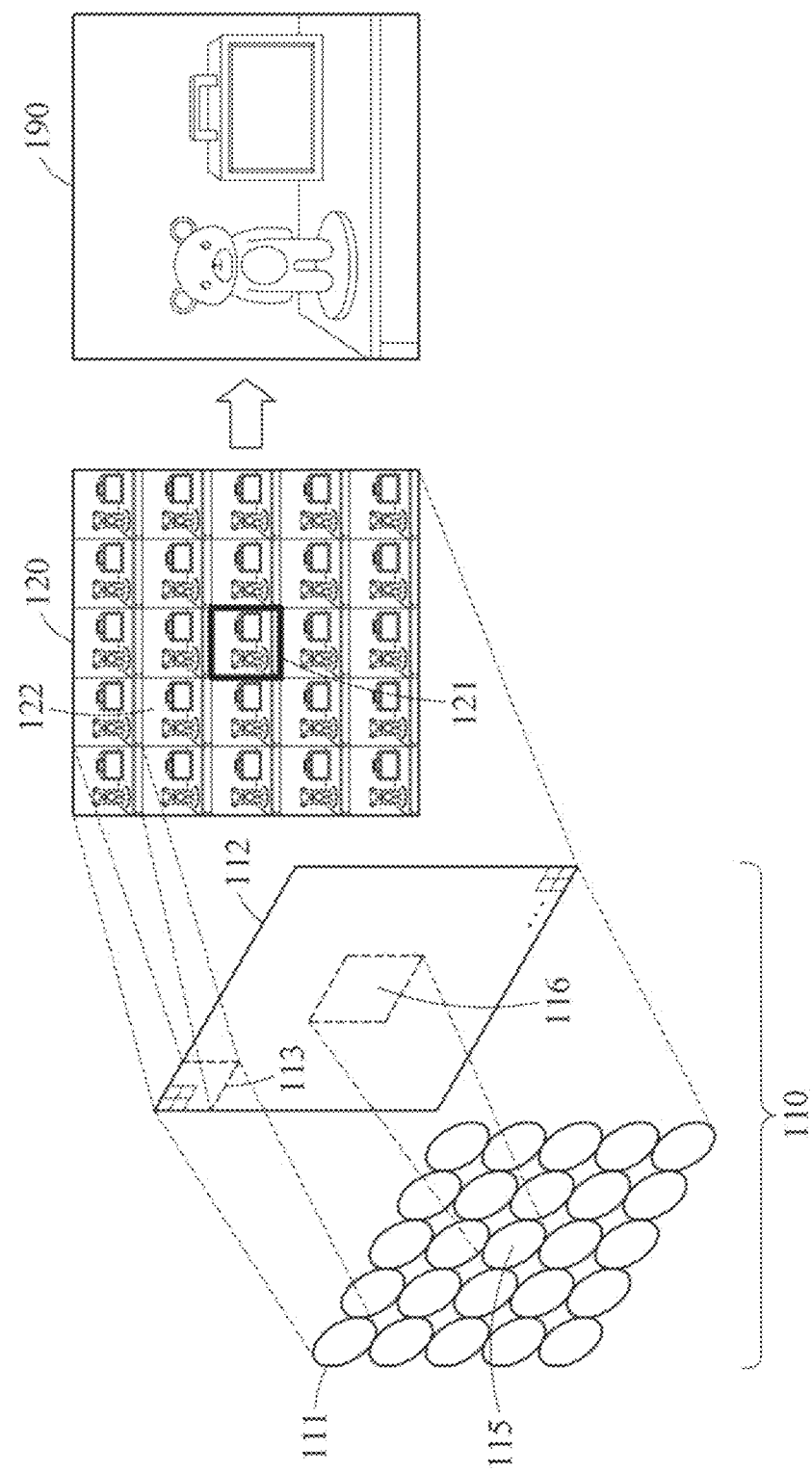
FIG. 1 illustrates an example of an overall process of image restoration according to an example embodiment.

Reference will now be made in detail to example embodiments, examples of which are illustrated in the accompanying drawings, wherein like reference numerals refer to the like elements throughout.

The following structural or functional descriptions are merely examples to describe embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of an overall process of image restoration according to an example embodiment.

According to an example embodiment, an image restoration device may restore an image based on information sensed from a scene. The image restoration device may be embodied by an imaging device 110, for example. The imaging device 110 may include a lens array and an image sensor. A quality of an image captured and restored by the imaging device 110 may be determined by the number of sensing elements included in the image sensor and an amount of light incident on the sensing elements. A sensing element described herein may be an image sensing element that is configured to sense light passing through the lens array and includes, for example, a complementary metal-oxide-semiconductor (CMOS), a charge-coupled device (CCD), or a photodiode.

The image sensor may include a sensing array 112 in which a plurality of sensing elements is arranged on a plane. For example, a resolution of an image may be determined by the number of the sensing elements included in the sensing array 112, and a sensitivity of the image may be determined by an amount of light incident on the sensing elements. In turn, the amount of light incident on the sensing elements may be determined based on a size of the sensing elements. Thus, as the size of each sensing element increases, the amount of light may also increase and a dynamic range of the sensing array 112 may increase. Thus, as the number of the sensing elements included in the sensing array 112 increases, the imaging device 110 may capture a high-resolution image. In addition, as the size of the sensing elements increases, the imaging device 110 may operate more effectively in capturing a high-sensitivity image at a low light level.

A size of the imaging device 110 may be determined by a focal length of a lens element 111. In detail, the size of the imaging device 110 may be determined by an interval between the lens element 111 and the sensing array 112. This is because, to collect light refracted by the lens element 111, the lens element 111 and the sensing array 112 need to be arranged separately from each other by a distance equal to the focal length of the lens element 111. The focal length of the lens element 111 may be determined by a viewing angle of the imaging device 110 and a size of the lens element 111. For example, when the viewing angle is fixed, the focal length may increase in proportion to the size of the lens element 111. As the size of the sensing array 112 increases to capture an image of a certain viewing angle range, the size of the lens element 111 may also need to increase. As described above, to increase a sensitivity of an image while maintaining a viewing angle and a resolution, the size of the imaging device 110 may increase. For example, to increase the sensitivity while maintaining the resolution, a size of each sensing element may need to increase while maintaining the number of the sensing elements included in the sensing array 112, and thus the size of the sensing array 112 may increase. In this example, to maintain the viewing angle, the size of the sensing array 112 may increase, and the size of the lens element 111 may also increase. Thus, the focal length of the lens element 111 may increase, and the size of the imaging device 110 may increase accordingly.

According to an example embodiment, to reduce the size of the imaging device 110, the lens array may include a plurality of lens elements corresponding to a plurality of viewpoints. The lens elements may be arranged on a plane of the lens array. The sensing array 112 may be divided into sensing regions corresponding to the lens elements. The plane of the lens array may be parallel to the plane of the sensing array 112, and separated from the plane of the sensing array 112 by the focal length of the lens element 111. The lens array may also be referred to as a multi-lens array (MLA). To decrease a size of each of the lens elements included in the lens array, that is, to increase the number of lenses to be included in a same area in the lens array, the focal length of the lens element 111 may decrease and the thickness of the imaging device 110 may thereby decrease. Thus, it is possible to embody a thin camera. In such a case, the imaging device 110 may realign and concatenate low-resolution viewpoint images 120 captured by the lens elements to restore a high-resolution output image 190.

The lens element 111 which is an individual lens element of the lens array may cover a sensing region 113 of the sensing array 112 corresponding to a lens size of the lens element 111. The sensing region 113 of the sensing array 112 that is covered by the lens element 111 may be determined by the lens size of the lens element 111. The sensing region 113 may be a region in the sensing array 112 in which rays in a certain viewing angle range arrive after passing through the lens element 111. The size of the sensing region 113 may be represented by a distance from a center of the sensing region 113 to an outermost point or a diagonal length, and the lens size may correspond to a diameter of a corresponding lens.

Each of the sensing elements of the sensing array 112 may generate sensed information based on a ray passing through the lenses of the lens array. For example, a sensing element may sense, as the sensed information, an intensity of light received through the lens element 111. The imaging device 110 may determine intensity information corresponding to an original signal associated with points included in a view of the imaging device 110 based on the sensed information output from the sensing array 112, and restore an image based on the determined intensity information.

When the diversity of the sensed information is sufficiently secured and a full rank relationship is established between the sensed information and original signal information corresponding to the points included in the view of the imaging device 110, an image corresponding to a maximum resolution of the sensing array 112 may be obtained. The diversity of the sensed information may be obtained based on parameters of the imaging device 110 such as the number of the lenses included in the lens array and the number of the sensing elements included in the sensing array 112.

In addition, the sensing region 113 covered by the lens element 111 may include a non-integer number of sensing elements. An MLA structure may be embodied in a fractional alignment structure. For example, when the lens elements included in the lens array have the same lens size, the number of the lens elements included in the lens array and the number of the sensing elements included in the sensing array 112 may have a relatively prime relationship. For example, a ratio P/L between the number L of the lens elements of the lens array and the number P of sensing elements in a single row or column of the sensing array 112 may be determined to be a non-integer number. Each of the lens elements may cover the number of sensing elements which is the same as a pixel offset corresponding to P/L.

As described above, through the fractional alignment structure, an optical center axis (OCA) of the lens elements of the imaging device 110 may be slightly differently arranged with respect to the sensing array 112. That is, the lens element 111 may be eccentrically arranged with respect to a sensing element. Thus, the lens elements of the lens array may receive different light field (LF) information. An LF may refer to a field indicating a direction and intensity of a ray that is radiated from an arbitrary target point and reflected from an arbitrary point on a subject. The LF information may indicate information in which a plurality of LFs is combined. A direction of a chief ray of each of the lens elements may vary, and thus the sensing regions may receive different LF information and the sensing regions may obtain slightly different input information. Through the slightly different input information, the imaging device 110 may obtain an optically greater amount of sensed information.

Although only the sensing array 112 of the image sensor is illustrated for the convenience of description, examples are not limited thereto. The image sensor may further include a condensing lens, a color filter (CF), and the like. The color filter may allow a ray of a wavelength corresponding to a color desired by a sensing element to pass through to be sensed, and to be transmitted to the sensing element. Thus, the sensing element may generate, as the sensed information, a color intensity value corresponding to the color. The color filter may be arranged in a Bayer pattern, but is not limited thereto. The condensing lens may be provided as a plurality of condensing lenses respectively corresponding to a plurality of sensing elements and respectively arranged on the sensing elements, and be configured to collect rays incident on the sensing elements. A condensing lens array may include the condensing lenses arranged on the plane of the sensing array 112.

According to an example embodiment, the imaging device 110 may include a plurality of sensing units. A number of sensing units may be equal to a number of lenses included in an MLA. For example, a sensing unit may include the lens element 111 and sensing elements of the sensing region 113 covered by the lens element 111. In the imaging device 110, a position at which each lens element is arranged may correspond to a viewpoint. A viewpoint may indicate a point from which a subject is observed and/or captured. As described above, the lens elements are arranged in the fractional alignment structure with respect to the sensing array 112, and thus information obtainable for each viewpoint may differ slightly. The imaging device 110 may capture an image (hereinafter "viewpoint image") corresponding to a viewpoint based on light received through the lens element arranged at that viewpoint.

According to an example embodiment, the imaging device 110 may capture a plurality of viewpoint images through lenses arranged at different positions. For example, the imaging device 110 may generate a viewpoint image from sensed information obtained for each sensing region corresponding to each lens. That is, each of the sensing units may obtain a viewpoint image. As described above, the sensing units may obtain different LF information, and thus viewpoint images captured by the sensing units may include slightly different scenes. For example, the imaging device 110 may include N lenses corresponding to N sensing units. The N sensing units may individually capture viewpoint images, and thus the imaging device 110 may obtain N viewpoint images. Here, N denotes an integer greater than or equal to 2. For example, as illustrated in FIG. 1, an MLA may include 25 (N=5×5=25) lenses, and an image sensor may capture 25 low-resolution viewpoint images 120. For another example, a multi-lens image may include 36 (N=6× 6=36) viewpoint images. Although it is described above that one imaging device 110 includes a plurality of sensing units, examples are not limited thereto. For example, a sensing unit may be an independent image sensing module, for example, a camera sensor. In this example, each sensing unit may be arranged at a position different from that of another sensing unit. For example, a sensing unit may be provided in each of a plurality of drones, and a positional relationship between sensing units may dynamically change as the drones move.

Referring to FIG. 1, the imaging device 110 may generate a plurality of low-resolution viewpoint images 120 from various sets of sensed information obtained as described above, and restore a high-resolution output image 190 based on a target image 121 among the generated low-resolution viewpoint images 120. The target image 121 may be captured by a target sensing unit corresponding to a target viewpoint, for example, a lens element 115 corresponding to the target viewpoint and a corresponding sensing region 116.

Although it is illustrated in FIG. 1 that a center image among the viewpoint images 120 is determined to be the target image 121, examples are not limited thereto. For example, another viewpoint image, for example, a viewpoint image 122, may also be used as a target image. In addition, the imaging device 110 may use an image of another additional image sensor as the target image. The additional image sensor may be an independent sensor different from the imaging device 110, for example, a camera sensor configured to capture a higher-resolution image compared to the imaging device 110.

Figure 2:
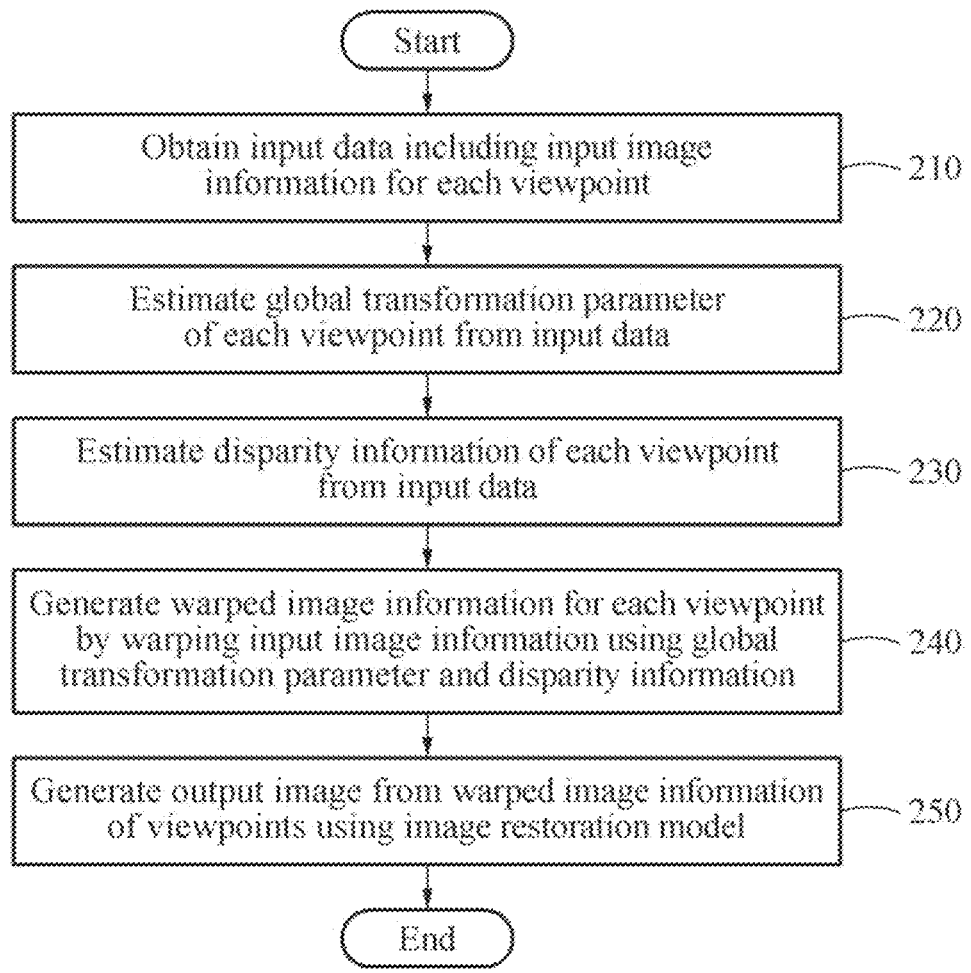
FIG. 2 illustrates a flowchart of an example of an image restoration method according to an example embodiment.
Figure 3:
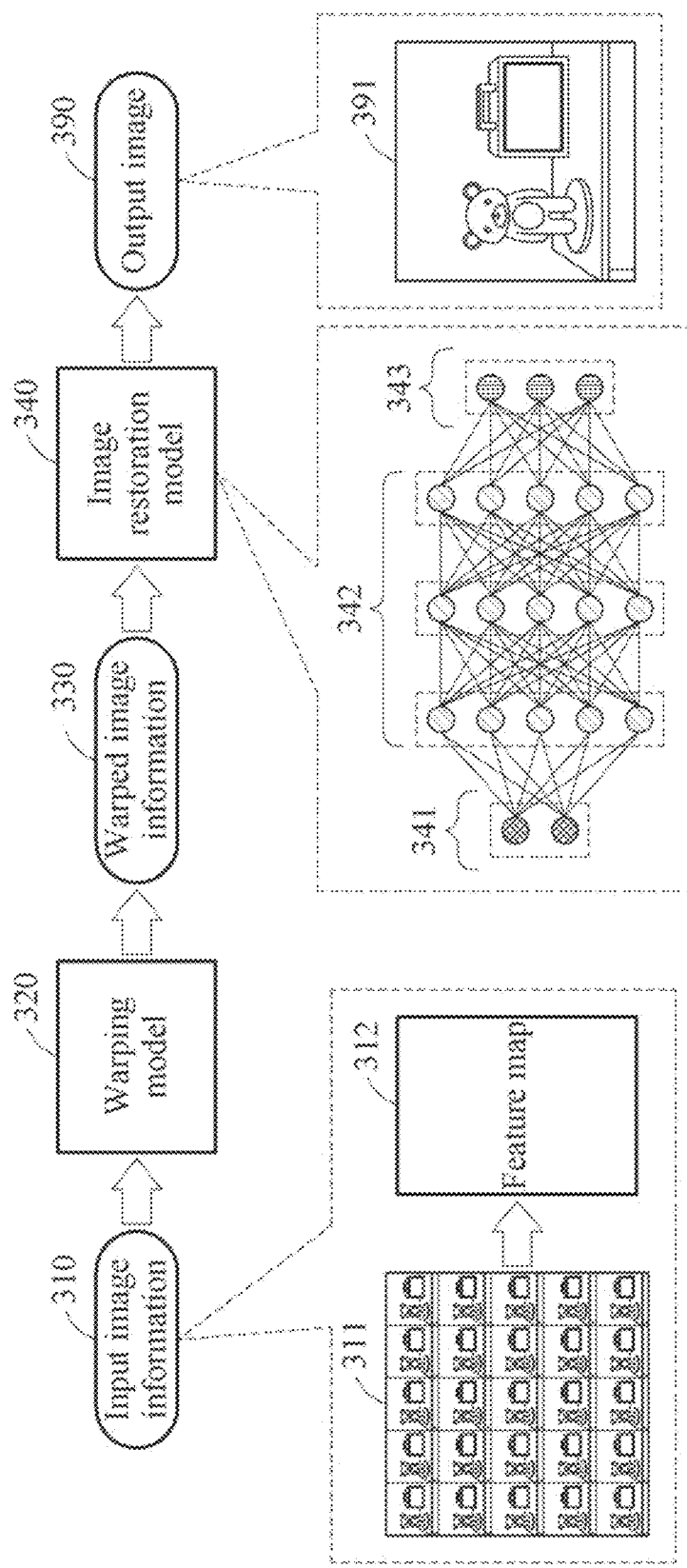
FIG. 3 illustrates an example of image restoration using a warping model and an image restoration model according to an example embodiment.

FIG. 2 illustrates a flowchart of an example of an image restoration method according to an example embodiment. FIG. 3 illustrates an example of image restoration using a warping model and an image restoration model according to an example embodiment.

Referring to FIGS. 2 and 3, in operation 210, an image restoration device obtains input data including input image information 310 for each of a plurality of viewpoints. The input data may refer to data to be input to a warping model 320, and may include a plurality of sets of the input image information 310 corresponding to the different viewpoints. The input data may be data in which the sets of the input image information 310 of the viewpoints are concatenated. For example, the input image information 310 corresponding to one of the viewpoints may include a viewpoint image 311 that is captured from the viewpoint, or a feature map corresponding to the viewpoint that is extracted from the viewpoint image 311. In this example, the input data may be data in which feature maps are concatenated. The viewpoint image 311 may refer to an image captured at a viewing angle determined by an optical system at the corresponding viewpoint, and may correspond to a set of sensed values from sensing elements that sense rays passing through a lens corresponding to the viewpoint. An input feature map 312 may indicate feature data and/or a feature vector that is extracted from the viewpoint image 311 sensed through the lens for capturing a corresponding scene. However, the input image information 310 is not limited to what is described in the foregoing. For example, the input image information 310 corresponding to a viewpoint may include the viewpoint image 311 itself corresponding to the viewpoint instead of the input feature map 312. The input feature map 312 will be described hereinafter as an example of the input image information 310, and extracting the input feature map 312 will be described in detail with reference to FIG. 4.

In operation 220, the image restoration device estimates a global transformation parameter of each of the viewpoints from the obtained input data. In other words, each of the viewpoints may correspond to a respective global transformation parameter. A global transformation parameter corresponding to one of the viewpoints may be a parameter for globally transforming the viewpoint of the viewpoint image 311 into a target viewpoint, and may include a rotation parameter, a translation parameter, and a scale parameter, for example. The rotation parameter corresponding to one viewpoint may indicate a degree of a rotation between a sensing unit of the viewpoint and a sensing unit of the target viewpoint, for example, rotations on three axes. The translation parameter corresponding to one viewpoint may indicate a level of translation between a sensing unit of the viewpoint and the sensing unit of the target viewpoint, for example, translation along each of the three axes. The scale parameter corresponding to one viewpoint may indicate a difference in scale between a sensing unit of the viewpoint and the sensing unit of the target viewpoint. The estimating of the global transformation parameter will be described in detail with reference to FIG. 5.

In operation 230, the image restoration device estimates disparity information of each of the viewpoints from the obtained input data. In other words, each of the viewpoints may correspond to respective disparity information. The disparity information may refer to information for correcting a disparity error between globally transformed image information and target image information, which will be described in operation 240. The disparity information may also be referred to herein as disparity correction information. The estimating of the disparity information will be described in detail with reference to FIG. 5.

In operation 240, the image restoration device generates warped image information 330 for each of the viewpoints by warping the input image information 310 using the global transformation parameter and the disparity information. In other words, each of the viewpoints may correspond to respective warped image information. For example, the warped image information 330 may include a warped feature map obtained by transforming the input feature map 312 extracted from an input image into a pixel coordinate system of a target sensing unit capturing a target image. However, the warped image information 330 is not limited to the foregoing. For example, the warped image information 330 may be a warped image itself obtained by transforming the input image into the pixel coordinate system of the target image. The warping performed using the global transformation parameter and the disparity information will be described in detail with reference to FIG. 6.

In operation 250, the image restoration device generates an output image 390 for the viewpoints using an image restoration model 340 from the generated warped image information 330. For example, first, the image restoration device may generate image information that is realigned according to a single viewpoint by performing a pixel shuffle on the generated warped image information 330. The pixel shuffle may refer to an operation of realigning or rearranging pixels indicating same and/or similar points in feature maps of the viewpoints and/or viewpoint images of the viewpoints to be near to one another. By the pixel shuffle, the image information that is realigned according to the single viewpoint may be generated. Then, the image restoration device may generate the output image 390 having a target resolution by applying the image restoration model 340 to the realigned image information. The output image 390 may be, for example, an image obtained through image registration of pixels of the viewpoint images based on the target image, and the target resolution of the output image 390 may be greater than or equal to a resolution of each of the individual viewpoint images. The output image 390 may be an image 391 obtained as the viewpoint images are integrated according to the single viewpoint.

According to an example embodiment, the image restoration model 340 may be a model that is trained to output the output image 390 from the warped image information 330. The warped image information 330 input to the image restoration model 340 may be the realigned image information that is obtained by the pixel shuffle for realignment according to the single viewpoint. The image restoration model 340 may be, for example, a neural network of a machine learning structure. The neural network may perform image registration-based image restoration and the like by mapping input data and output data that are in a nonlinear relationship to each other based on deep learning. The deep learning may be a machine learning method used to solve an issue of image registration from a big dataset, and may map the input data and output data through supervised or unsupervised learning. For example, as illustrated, the neural network may include an input layer 341, a plurality of hidden layers 342, and an output layer 343. Data input through the input layer 341 may be propagated through the hidden layers 342 and then be output from the output layer 343. However, data may be input directly to the hidden layers 342 or data may be output directly from the hidden layers 342, instead of the input layer 341 and the output layer 343. Although the example that the image restoration model 340 includes the neural network is described above, examples are not limited to the foregoing. A portion of a warping model and a feature extraction model that will be described hereinafter may also include a neural network. The neural network may be trained through backpropagation, for example. Hereinafter, the training of the image restoration model 340 will be described in detail with reference to FIG. 7.

The image restoration model 340 may be embodied by a convolutional neural network (CNN). The CNN may be a neural network including convolutional layers, and the hidden layers 342 of the CNN may include a convolutional layer that applies convolution filtering to input data. For example, the CNN may include a convolutional layer of which nodes are connected through a kernel. The CNN may be a network trained in advance to output the output image 390 of a high resolution from a plurality of sets of the warped image information 330. The image restoration device may extract feature data by performing convolution filtering on data input to the convolutional layer. The feature data may be data of which a feature of an image is abstracted, and may indicate a value resulting from a convolution operation based on a kernel of the convolutional layer. The image restoration device may perform the convolution operation on a pixel at a position and neighboring pixels of the pixel using values of elements of the kernel. The image restoration device may calculate a convolution operation value of each of pixels by sweeping a kernel across the pixels of an image. The convolutional layers of the image restoration model may be connected in a U-net architecture, but are not limited thereto.

According to an example embodiment, the image restoration device may reconstruct feature maps of each of the plurality of viewpoint images by performing warping using a global transformation parameter and disparity information. The image restoration device may align the feature maps with a target viewpoint, without information given in advance, for example, a camera parameter and depth information.

Figure 4:
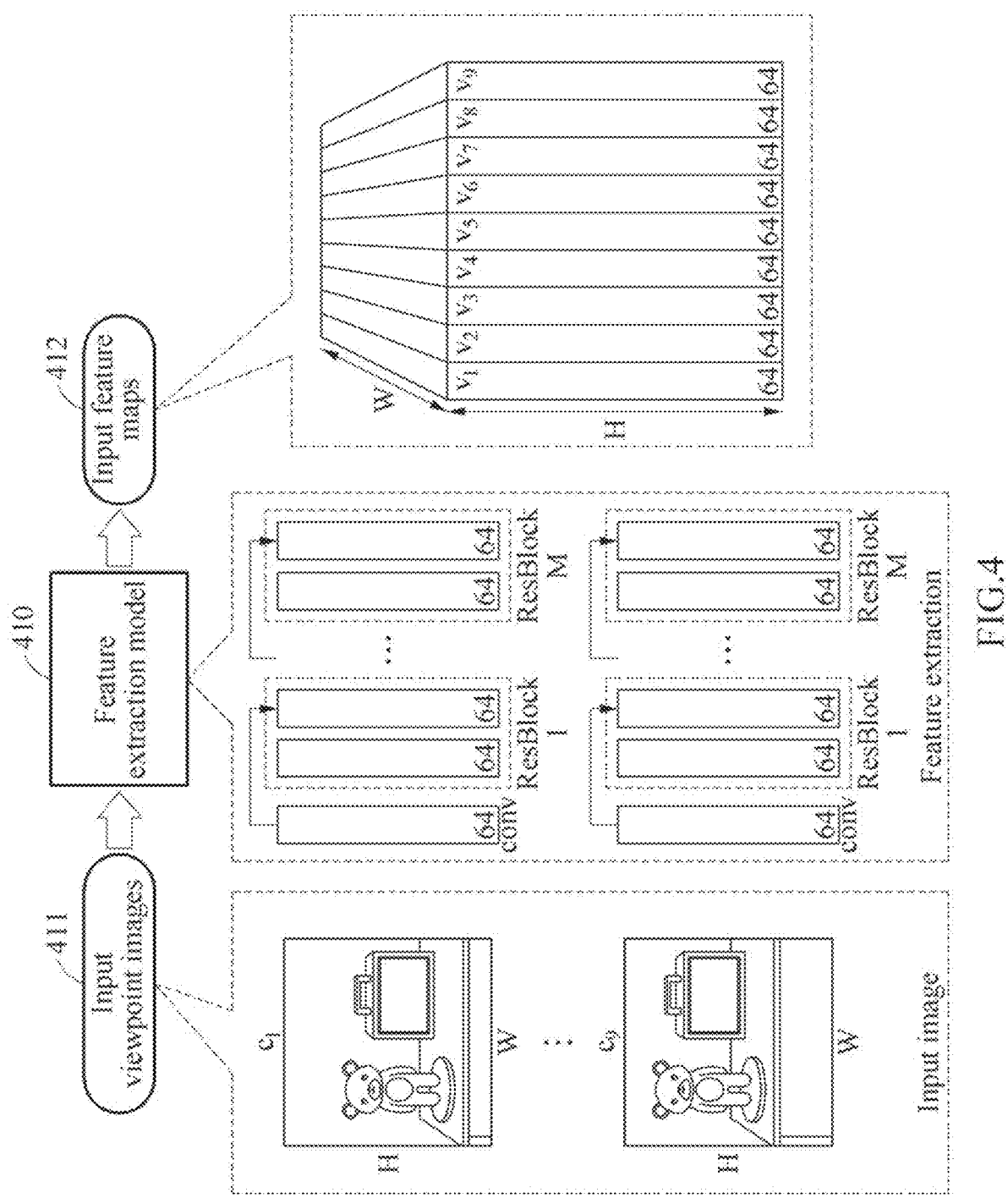
FIG. 4 illustrates an example of a feature extraction model for generating input image information according to an example embodiment.

FIG. 4 illustrates an example of a feature extraction model for generating input image information according to an example embodiment.

Referring to FIG. 4, an image restoration device captures a plurality of viewpoint images 411 through lenses arranged at different positions. In the example of FIG. 4, a resolution of each of the viewpoint images 411 is H×W, in which H denotes the number of pixels arranged along a height of each of the viewpoint images 411 and W denotes the number of pixels arranged along a width of each of the viewpoint images 411. Each of H and W may be an integer greater than or equal to 1. For example, as illustrated, the image restoration device captures the viewpoint images 411 including a first viewpoint image $c_1$ through a ninth viewpoint image $c_9$. Each of the viewpoint images 411 may include a color image which includes three channel images—a red channel image, a green channel image, and a blue channel image—and may correspond to data having a 3×H×W dimension. In other words, each viewpoint image 411 may include data for a number of pixels equal to 3×H×W.

The image restoration device obtains input image information corresponding to each of the viewpoints from the captured viewpoint images 411. For example, the image restoration device extracts, as a plurality of sets of the input image information, a plurality of input feature maps 412 from the viewpoint images 411 using a feature extraction model 410.

The feature extraction model 410 includes one or more convolutional layers. The feature extraction model 410 includes convolutional layers connected in a form of a residual block (ResBlock as illustrated). In the example of FIG. 4, the feature extraction model 410 includes one convolutional layer and M residual blocks for each viewpoint. Here, M denotes an integer greater than or equal to 2. A residual block includes one or more convolutional layers. Through the convolutional layers, the residual block may extract feature data from data input to the residual block, and output a result of adding the extracted feature data and the data input to the residual block. For example, an output of a jth residual block may be input to a j+1th residual block. In this example, j denotes an integer greater than or equal to 1 and less than or equal to M−1. The image restoration device extracts, as the input feature maps 412, results obtained by applying convolution filtering by one or more residual blocks to the viewpoint images 411. The feature extraction model 410 is illustrated in FIG. 4 as including a total of V×M residual blocks that are independently distinguished according to each viewpoint. Here, V denotes the number of viewpoints, which is an integer greater than or equal to 2. In the example of FIG. 4, V is 9. However, examples are not limited to the foregoing. For example, the image restoration device may apply the M residual blocks of the feature extraction model 410 to respective viewpoints in sequential order.

For example, an input feature map 412 of a viewpoint may include feature data and/or a feature vector that is extracted from one of the viewpoint images 411 corresponding to the viewpoint based on the feature extraction model 410. The image restoration device generates the input feature maps 412 corresponding to the viewpoints, and generates input data by concatenating the generated input feature maps 412. For example, a feature map extracted from a viewpoint image of a viewpoint by a convolutional layer and a residual block of the feature extraction model 410 may be augmented by a factor of D. In this example, D is an integer greater than or equal to 1. For example, each of the input feature maps 412 may have a H×W×D dimension. In this example, a dimension of the total input data may then be H×W×D×V. Here, an example that D=64 is described.

Figure 5:
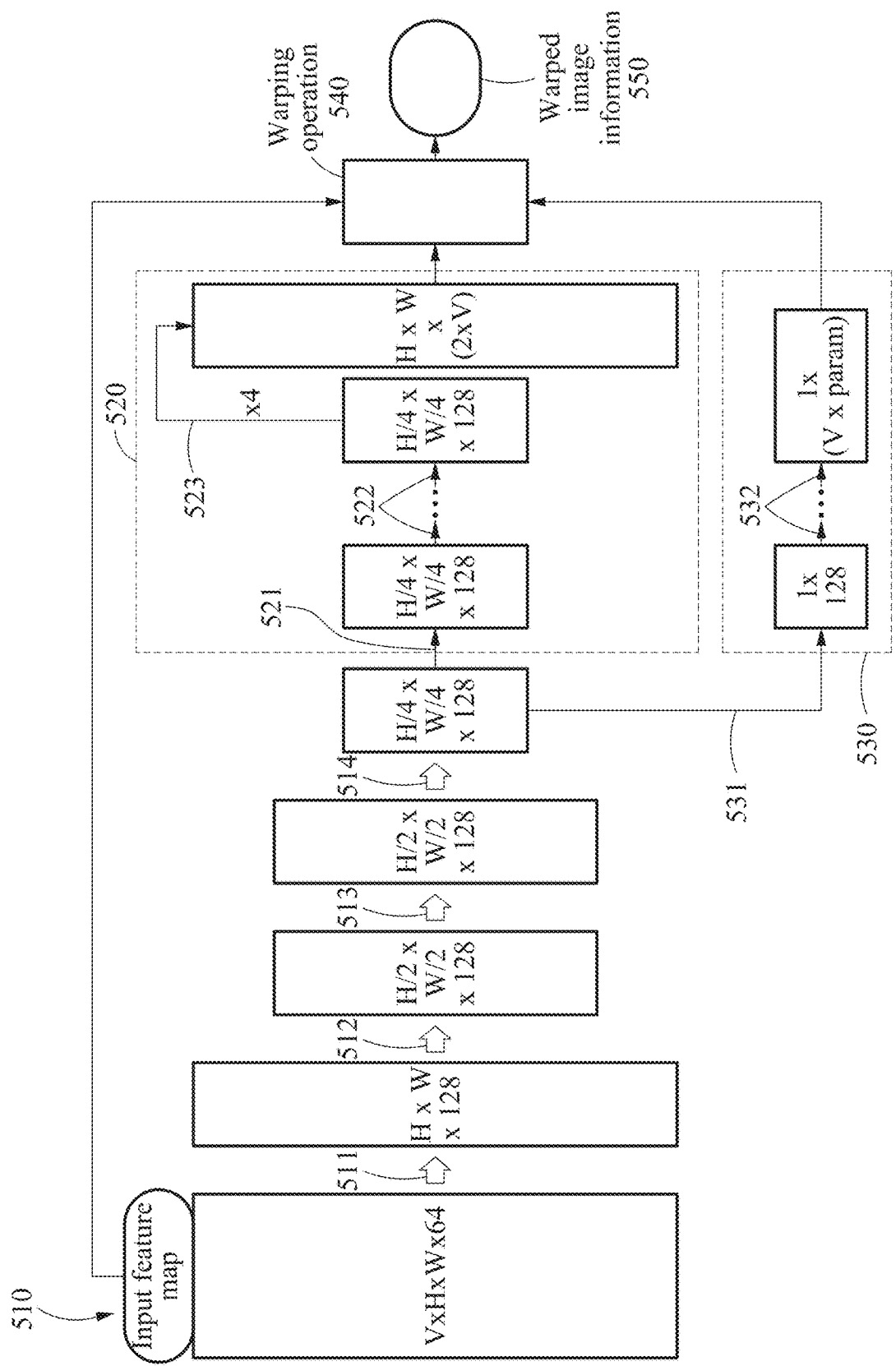
FIG. 5 illustrates an example of a warping model according to an example embodiment.

FIG. 5 illustrates an example of a warping model according to an example embodiment.

Referring to FIG. 5, a warping model includes a global transformation parameter estimator 530, a disparity estimator 520, and a warping operation 540. The warping model may include a plurality of convolution operations and a plurality of pooling operations.

An image restoration device generates feature data extracted from input data 510. For example, the feature data may be pooling data that is pooled from the input data 510. For example, the image restoration device applies convolution filtering 511 to the input data 510. In this example, the feature data having dimensions of H×W×128 may be extracted from the input data 510 having dimensions of V×H×W×64. The image restoration device applies a pooling layer 512 and a convolutional layer 513 to the feature data for downsampling. The dimension of the feature data may then be reduced to H/2×W/2×128. The image restoration device applies a pooling layer 514 again for downsampling, and thus generates pooling data having dimensions of H/4×W/4×128. Although it is illustrated in FIG. 5 that a pooling layer reduces a height and a width of data by half, examples are not limited to the foregoing.

The image restoration device estimates a global transformation parameter through the global transformation parameter estimator 530. For example, the image restoration device obtains information in which a spatial dimension component is removed from the input data 510 through a global pooling operation 531. The global pooling operation 531 may be a global average pooling operation. As a result of the global average pooling operation, the information in which the spatial dimension component is removed is obtained having dimensions of 1×128. The image restoration device calculates the global transformation parameter from the information in which the spatial dimension component is removed. For example, the image restoration device applies, to the information in which the spatial dimension component is removed, an operation associated with one or more fully-connected (FC) layers 532 of, for example, a convolutional neural network. The FC layers 532 may be provided as a plurality of FC layers in number. The global transformation parameter may have dimensions of 1×(V×param). Here, "param" denotes a dimension of a global transmission parameter for each viewpoint, and is 7 because a total of seven parameters is required. The seven parameters are calculated for each viewpoint and include a rotation parameter for each of three axes, a translation parameter for each of the three axes, and a scale parameter. In the example of FIG. 5, V=9, and the dimension of the global transformation parameter is therefore 1×63. However, examples are not limited to the foregoing, and the required number of parameters (param) may vary according to a global transformation algorithm. For example, when, as another model for a global transformation, a two-dimensional (2D) affine transformation model is used, six parameters may be required instead of seven.

The image restoration device estimates disparity information for each pixel with respect to each of the viewpoints by performing convolution filtering one or more times on the pooling data that is pooled from the input data 510. For example, the image restoration device performs convolution filtering twice at 521 and 522 on the pooling data downsampled from the input data 510. In the example of FIG. 5, a result of the convolution filtering is feature data of an H/4×W/4×128 dimension. The image restoration device calculates the disparity information for each pixel with a same resolution as that of the input data 510 while upsampling 523 the result of the convolution filtering. For example, a dimension of the disparity information is H×W×(2×V). In the example of FIG. 5, V=9, and thus the dimension of the disparity information is H×W×18. In this example, a total of two disparity values including a disparity on a horizontal axis (e.g., an x axis) and a disparity on a vertical axis (e.g., a y axis) for each of H×W pixels are calculated for each of V viewpoints.

A configuration of each layer of the warping model is not limited to the example illustrated in FIG. 5, and the number of layers and dimensions may change according to design.

The image restoration device generates warped image information 550 by applying the warping operation 540 to input feature maps of the input data 510 using the global transformation parameter and the disparity information that are calculated as described above. Hereinafter, the warping operation 540 will be described in detail with reference to FIG. 6.

Figure 6:
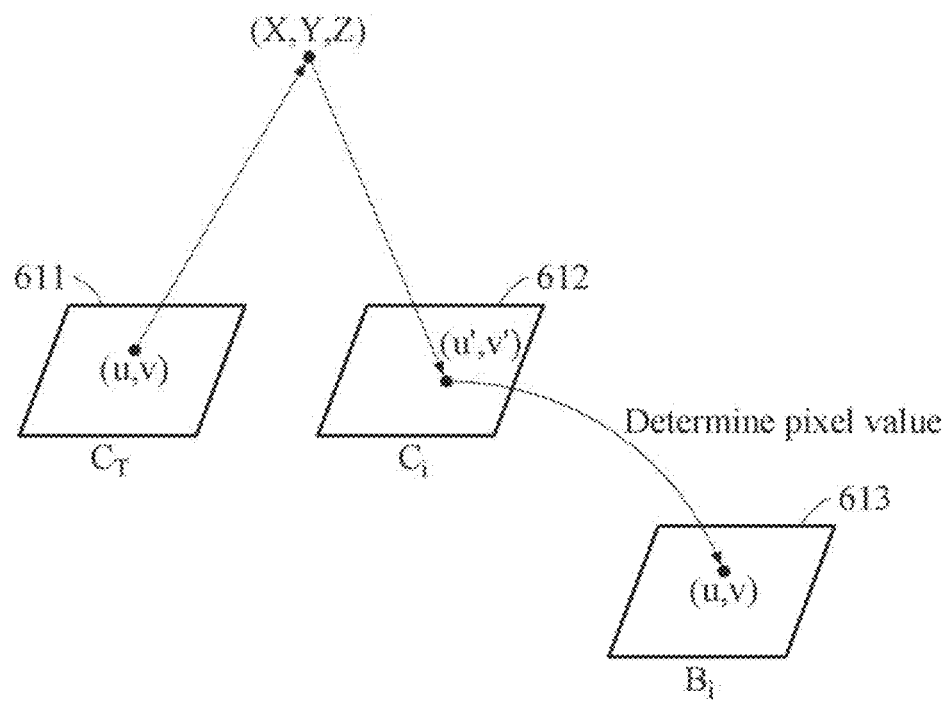
FIG. 6 illustrates an example of a warping operation according to an example embodiment.

FIG. 6 illustrates an example of a warping operation according to an example embodiment.

According to an example embodiment, an image restoration device may generate transformed image information by transforming input image information for each of viewpoints into a pixel coordinate system of target image information corresponding to a target viewpoint, using a global transformation parameter. The image restoration device may correct a disparity of the transformed image information with respect to the target image information, using disparity information. Hereinafter, a global transformation and a disparity correction will be described with reference to FIG. 6.

The image restoration device may perform backward warping to warp backward all pixels of the input image information to a pixel coordinate system corresponding to a target image, using a single depth corresponding to a reference disparity. Hereinafter, an example of backward warping will be described in detail. For example, the image restoration device may calculate a coordinate in the input image information corresponding to a position that is based on the pixel coordinate system of the target image information, using a rotation parameter, a translation parameter, and a scale parameter that are included in the global transformation parameter. The image restoration device may determine a pixel value of the coordinate calculated in the input image information to be a pixel value at the position in the transformed image information. Hereinafter, the global transformation will be described in detail.

A disparity may indicate a difference between two images in terms of a position of a same target point, for example, a difference in pixel coordinate. According to an example embodiment, a disparity with the target image may be set to be the reference disparity for each input image. The reference disparity may be set as an arbitrary value. Based on the reference disparity, a virtual distance (e.g., a depth value) from an image sensor to a target point may be determined.

For example, as illustrated in FIG. 6, image information of an ith viewpoint image among N viewpoint images may be warped to a pixel coordinate system corresponding to image information of a target viewpoint image, and thereby warped image information may be generated. As described above, the image restoration device may generate a warped feature map from the warped image information by warping a feature map extracted from the ith viewpoint image. In this case, the image information of the ith viewpoint image may indicate an ith feature map extracted from the ith viewpoint image by an ith sensing unit $C_i$ 612, and the image information of the target viewpoint image may indicate a target feature map extracted from the target viewpoint image by a target sensing unit $C_T$ 611.

The world coordinate system described above may indicate a three-dimensional (3D) coordinate system having, as a reference, a point in a world. In addition, the camera coordinate system described above may indicate a 3D coordinate system having, as a reference, a position of a camera. For example, a principal point of a sensing unit may be used as an original point or a starting point, an optic axis direction of the sensing unit may be indicated by a z axis, a vertical direction of the sensing unit may be indicated by a y axis, and a horizontal direction of the sensing unit may be indicated by an x axis. A pixel coordinate system described herein may also be referred to as an image coordinate system and indicate a 2D coordinate of a pixel in an image.

For example, as illustrated, a world coordinate of a target point separated from an image sensor may be (X, Y, Z). In this example, a pixel coordinate corresponding to the target point that is sensed by the ith sensing unit $C_i$ 612 among the N sensing units may be (u', v'), and a pixel coordinate corresponding to the target point that is sensed by the target sensing unit $C_T$ 611 may be (u, v). However, an accurate distance to the target point may not be readily determined only with a pixel value sensed by each sensing unit. According to an example embodiment, the image restoration device may assume that the input image information already has the reference disparity with respect to the target image information, and may warp the input image information to the pixel coordinate system of the target image information using a distance value corresponding to the assumed disparity. Here, backward warping may be performed.

The image restoration device may calculate a normalized coordinate $(x_T, y_T)$ of the target sensing unit $C_T$ 611 by normalizing a pixel coordinate $(u_T, v_T)$ of each pixel of the target image information, as represented by Equation 1 below.

$$x_T = (u_T - c_x^{(T)})/\theta_x^{(T)}$$

$$y_T = (v_T - c_y^{(T)})/\theta_y^{(T)} \quad \text{[Equation 1]}$$

In Equation 1, $(C_x^{(T)}, C_y^{(T)})$ denotes a principal point of the target sensing unit $C_T$ 611 on the x axis and the y axis, respectively. $f_x^{(T)}, f_y^{(T)}$ denotes a focal length of the target sensing unit $C_T$ 611 with respect to the x axis and the y axis, respectively. As represented by Equation 1, the image restoration device may normalize each pixel of the target sensing unit $C_T$ 611 by using a principal point of the target sensing unit $C_T$ 611 as an original point and dividing it by a focal length. Here, when principal point and focal length information of each sensing unit are unknown, a center position of an image may be used as a principal point and an arbitrary value may be used as a focal length.

In addition, the image restoration device may calculate a 3D camera coordinate $(X_T, Y_T, Z_T)$ of the target sensing unit $C_T$ 611 using a single depth z corresponding to the reference disparity with respect to the normalized coordinate $(x_T, y_T)$, as represented by Equation 2 below.

$$X_T = x_T \cdot z$$

$$Y_T = y_T \cdot z$$

$$Z_T = z_T \cdot z \quad \text{[Equation 2]}$$

By multiplying each of the normalized coordinate $(x_T, y_T)$ by the depth z, the image restoration device may obtain $X_T$ and $Y_T$ as represented by Equation 2 above. Thus, the image restoration device may calculate the 3D camera coordinate having an optic axis of the target sensing unit $C_T$ 611 as a reference.

The image restoration device may transform the 3D camera coordinate of the target image information that is transformed using the disparity as represented by Equation 2 above into a 3D camera coordinate $(X_i, Y_i, Z_i)$ of the ith sensing unit $C_i$ 612, as represented by Equation 3 below.

$$\begin{bmatrix} X_i \\ Y_i \\ Z_i \end{bmatrix} = R_i \begin{bmatrix} X_T \\ Y_T \\ Z_T \end{bmatrix} + T_i \quad \text{[Equation 3]}$$

In Equation 3, Ri denotes rotation information between the target sensing unit $C_T$ 611 and the ith sensing unit $C_i$ 612 in the world coordinate system. $T_i$ denotes parallel translation information between the target sensing unit $C_T$ 611 and the ith sensing unit $C_i$ 612 in the world coordinate system. The rotation information may also be referred to as a rotation parameter, and the translation information may also be referred to as a translation parameter. As represented by Equation 3 above, the image restoration device may calculate the 3D camera coordinate $(X_i, Y_i, Z_i)$ of an ith sensing unit $C_i$ 612 corresponding to each pixel of the target sensing unit $C_T$ 611 by transforming the 3D camera coordinate $(X_T, Y_T, Z_T)$ using a rotation parameter $R_i$ and a translation parameter $T_i$.

The rotation parameter $R_i$ may indicate a rotation matrix between the target sensing unit $C_T$ 611 and the ith sensing unit $C_i$ 612 in the world coordinate system. The translation parameter $T_i$ may indicate a translation matrix between the target sensing unit $C_T$ 611 and the ith sensing unit $C_i$ 612 in the world coordinate system. The translation parameter $T_i$ may include, for example, three parameters as represented by $T_i = [t_x^{(i)}, t_y^{(i)}, t_z^{(i)}]^T$. The rotation parameter $R_i$ may be determined, for example, from three parameters $R_x^{(i)}, R_y^{(i)}, R_z^{(i)}$. The rotation parameter $R_i$ may be calculated from the three parameters $R_x^{(i)}, R_y^{(i)}, R_z^{(i)}$, as represented by Equation 4 below.

$$R = R_x(\alpha) R_y(\beta) R_x(\gamma) =$$

$$\begin{bmatrix} \cos\alpha & -\sin\alpha & 0 \\ \sin\alpha & \cos\alpha & 0 \\ 0 & 0 & 1 \end{bmatrix}^{yaw} \begin{bmatrix} \cos\beta & 0 & \sin\beta \\ 0 & 1 & 0 \\ -\sin\beta & 0 & \cos\beta \end{bmatrix}^{pitch} \begin{bmatrix} 1 & 0 & 0 \\ 0 & \cos\gamma & -\sin\gamma \\ 0 & \sin\gamma & \cos\gamma \end{bmatrix}^{roll}$$

$$R = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}$$

[Equation 4]

In Equation 4, α denotes a yawing rotation angle with respect to the z axis. β denotes a pitch rotation angle with respect to the y axis. γ denotes a rolling rotation angle with respect to the x axis.

In addition, the image restoration device may normalize the 3D camera coordinate $(X_i, Y_i, Z_i)$ that is based on the ith sensing unit $C_i$ 612 calculated from each pixel coordinate of the target image information, as represented by Equation 5 below.

$$x_i = X_i/Z_i$$

$$y_i = Y_i/Z_i \quad \text{[Equation 5]}$$

As represented by Equation 5 above, the image restoration device may $X_i$ and $Y_i$ by a depth $Z_i$ in the 3D camera coordinate that is based on the ith sensing unit $C_i$ 612, and thus obtain a normalized coordinate $(x_i, y_i)$ for the ith sensing unit $C_i$ 612. Here, the image restoration device may consider a case in which sensing units have different focal lengths, and may multiply the normalized coordinate $(x_i, y_i)$ by a scake parameter as represented by Equation 6 below.

$$x_i \leftarrow s_i \cdot x_i$$

$$y_i \leftarrow s_i \cdot y_i \quad \text{[Equation 6]}$$

The image restoration device may then calculate the pixel coordinate (u', v') of the pixel coordinate system corresponding to the ith image information from the normalized coordinate $(x_i, y_i)$ of the ith sensing unit $C_i$ 612, as represented by Equation 7 below.

$$u' = f_x^{(i)} \cdot x_i + c_x^{(i)}$$

$$v' = f_y^{(i)} \cdot y_i + c_y^{(i)} \quad \text{[Equation 7]}$$

In Equation 7, $c_x^{(i)}$ and $c_y^{(i)}$ and denote principal points of the ith sensing unit $C_i$ 612 with respect to the x axis and the y axis, respectively. In addition, $f_x^{(i)}$ and $f_y^{(i)}$ denote focal lengths of the ith sensing unit $C_i$ 612 with respect to the x axis and the y axis, respectively.

Through Equations 1 through 7 above, the image restoration device may transform the pixel coordinate (u, v) of the targeting sensing unit $C_T$ 611 into the pixel coordinate (u', v') of the ith sensing unit $C_i$ 612. The image restoration device may determine a pixel value of a pixel coordinate (u, v) of warped image information $B_i$ 613 to be the pixel value of the pixel coordinate (u', v') of the ith image information. In other words, the warped image information $B_i$ 613 may associate the pixel value of the pixel coordinate (u', v') of the ith image information with the pixel coordinate (u, v) of the target sensing unit $C_T$ 611. When the coordinate transformed from the pixel coordinate (u, v) of the target sensing unit $C_T$ 611 is not present in the ith image information, the image restoration device may perform padding, for example, zero padding. A series of coordinate transformations and operations of determining a pixel value in a transformed coordinate to be a value of warped image information based on Equations 1 through 7 above may be referred to as backward warping. Although the backward warping is described in a time series manner for the convenience of description, examples are not limited thereto. For example, an operation in which operations based on Equations 1 through 7 are combined, for example, a unified matrix operation, may be used.

Although the global transform is described above as being performed using a single depth, a depth of each pixel of input image information may differ. The image restoration device may additionally perform disparity correction in addition to the global transform (e.g., global warping). For example, the image restoration device may correct a disparity in each pixel with respect to the x axis and the y axis, as represented by Equation 8 below.

$$d^{T \to i}([x_T, y_T]^T) = [d_x^{T \to i}([x_T, y_T]^T), d_y^{T \to i}([x_T, y_T]^T)] \quad \text{[Equation 8]}$$

In Equation 8, $d_{T \to i}([x_T, y_T]^T)$ denotes a disparity value from a current coordinate $(x_T, y_T)$ to an ith sensing unit. An entire warping operation including Equation 8 above may be represented by Equation 9 below.

$$[x_i, y_i]^T = G([x_T, y_T]^T) + d^{T \to i}([x_T, y_T]^T) \quad \text{[Equation 9]}$$

In Equation 9, $G([x_T, y_T]^T)$ indicates a series of operations of Equations 1 through 7.

Figure 7:
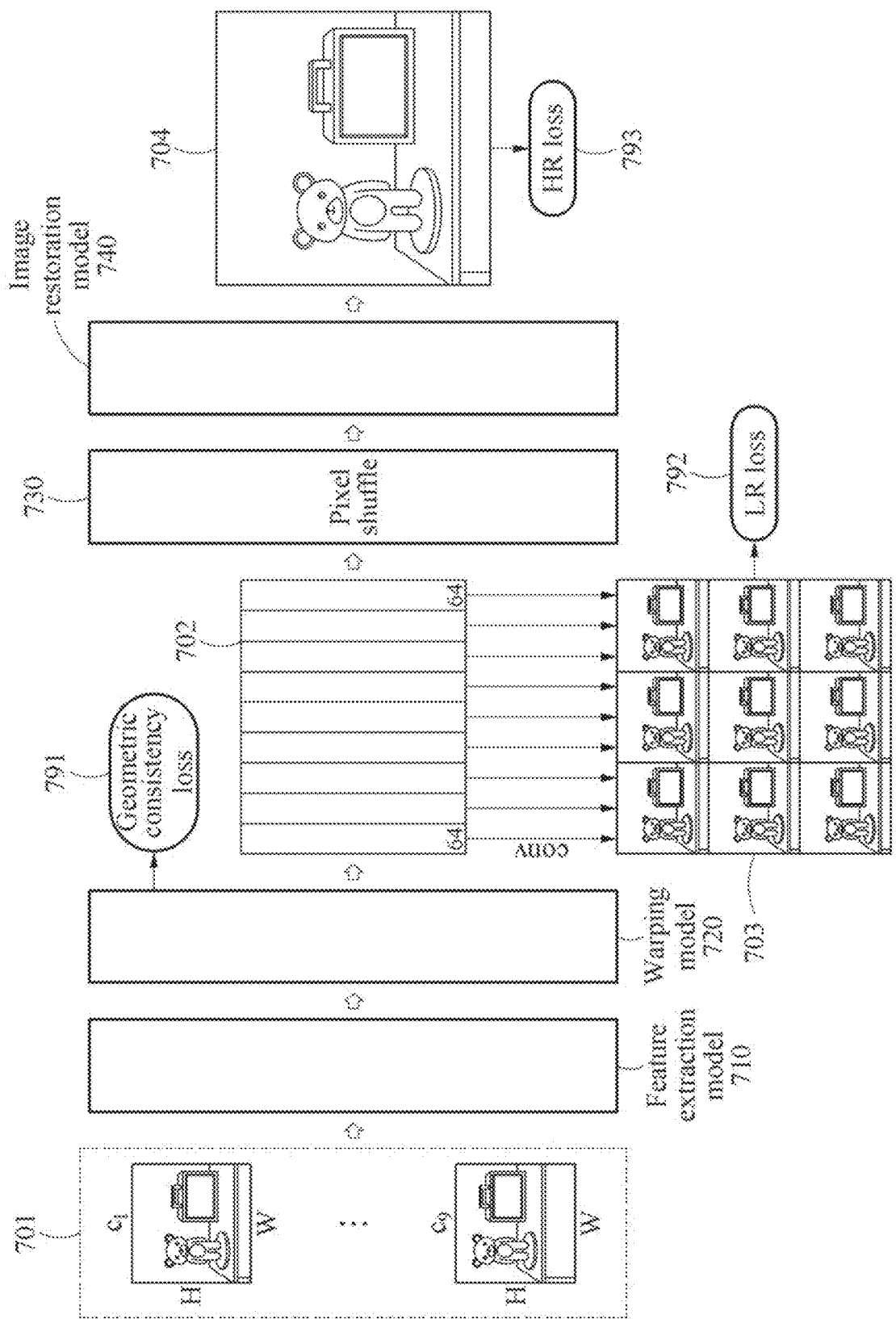
FIG. 7 illustrates an example of training a feature extraction model, a warping model, and an image restoration model according to an example embodiment.

FIG. 7 illustrates an example of training a feature extraction model, a warping model, and an image restoration model according to an example embodiment.

Referring to FIG. 7, a feature extraction model 710, a warping model 720, and an image restoration model 740 may be a machine learning model and include a neural network, for example. For example, the feature extraction model 710 may include a neural network of a structure illustrated in FIG. 4, the warping model 720 may include a neural network of a structure illustrated in FIG. 5, and the image restoration model 740 may include a neural network of a U-net structure. The feature extraction model 710, the warping model 720, and the image restoration model 740 before training is completed may be referred to as a temporary feature extraction model 710, a temporary warping model 720, and a temporary image restoration model 740, respectively.

A training device may train the temporary feature extraction model 710, the temporary warping model 720, and the temporary image restoration model 740 based on training data. The training data may include a pair of a training input and a training output. The training input may be low-resolution viewpoint images captured from a plurality of viewpoints, and the training output may be a high-resolution image of a single viewpoint corresponding to the training input. The training device may train the temporary feature extraction model 710, the temporary warping model 720, and the temporary image restoration model 740 such that the training output is output from the training input. For example, the training device may calculate at least one loss value while propagating the training input to the temporary feature extraction model 710, the temporary warping model 720, and the temporary image restoration model 740, and update parameters (e.g., connection weights) of the models based on the calculated loss. The training device may update the connection weights of the models such that the loss value is reduced. The training device may repeatedly perform the training until the loss value becomes less than or equal to a threshold loss value. When the loss value is less than or equal to the threshold loss value, the training device may complete the training.

For example, as illustrated, the training device may apply, to the feature extraction model 710, training viewpoint images 701 as the training input. The training device may propagate, to the warping model 720, temporary feature maps extracted from the training viewpoint images 701 using the feature extraction model 710. Here, a positional relationship between viewpoint images captured by a multi-camera or a multi-lens camera may be fixed or predetermined in general. Thus, a global transform on each viewpoint may need to be invariantly performed on an input image. As a constraint that allows a global transformation parameter for each viewpoint to have a same or similar value for each batch during the training, a loss value may be defined as represented by Equation 10 below.

$$l_{Geo} = \frac{1}{BN} \sum_b \sum_v \| p_v^{(b)} - \overline{p}_v \|^2 \quad \text{[Equation 10]}$$

Equation 10 above may define a geometric consistency loss $l_{Geo}$ 791. In Equation 10, B denotes a size of a batch used during the training. v denotes an index indicating a viewpoint, and is an integer greater than or equal to 1 and less than or equal to N. N denotes a total number of viewpoints. $p_v^{(b)}$ denotes a global transformation parameter of a bth batch corresponding to a vth viewpoint image, in which b denotes an index indicating a batch and is greater than or equal to 1 and less than or equal to B. $\bar{p}_v$ denotes a mean global transformation parameter of the vth viewpoint images of all batches. Thus, $l_{Geo}$ 791 may be a variance of global transformation parameters of the batches. The training device may update a parameter of the warping model 720 by minimizing the variance $l_{Geo}$ 791 such that a consistent global transformation parameter is output for each batch.

The training device may calculate temporary warped feature maps 702 from the temporary feature maps using the warping model 720. The training device may transform the temporary warped feature maps 702 into low-resolution warped images 703, for example, RGB images as color images, using a convolutional layer. The training device may calculate a low-resolution loss $l_{LR}$ 792 using the low-resolution color images and a training output image downsampled to a low resolution, as represented by Equation 11 below.

$$l_{LR} = \frac{1}{N}\sum_{v=0}^{N}\|I_M^{(v)} - I_{LR}\|^2 \qquad \text{[Equation 11]}$$

In Equation 11, $l_M^{(v)}$ denotes a temporary low-resolution warped image aligned from a with viewpoint to a target viewpoint. $I_{LR}$ denotes an experimentally determined (i.e., ground truth) low resolution image obtained by downsampling a training output image. $\|\ \|$ denotes an L2 norm. N denotes a total number of viewpoints. Through the training using the loss of Equation 11, parameters of the models may be updated such that viewpoint images are aligned with a target viewpoint.

The training device may generate a temporary output image 704 having a target resolution from the temporary warped feature maps 702. For example, the training device may perform a pixel shuffle 730 on the temporary warped feature maps 702 to obtain the target resolution, and generate the temporary output image 704 using the temporary image restoration model 740 of the U-net structure. The training device may calculate a high-resolution loss $l_{HR}$ 793 between the restored temporary output image 704 and the ground truth value image, as represented by Equation 12 below.

$$l_{HR} = \|I_{SR} - I_{HR}\|^2 \qquad \text{[Equation 12]}$$

In Equation 12, $I_{HR}$ denotes a training output image given as a ground truth value, and $I_{SR}$ denotes the temporary output image 704 restored to have a target resolution. Equation 12 may represent an L2 loss between the training output image and the temporary output image 704.

A total loss of an entire image restoration network may be calculated using the losses represented in Equations 10 through 12, as represented by Equation 13.

$$l = l_{HR} + \lambda_{LR} l_{LR} + \lambda_{geo} l_{geo} \qquad \text{[Equation 13]}$$

In Equation 13, $\lambda_{LR}$ and $\lambda_{geo}$ denote a weight of $l_{LR}$ 792 of Equation 11 and a weight of the geometric consistency loss $l_{Geo}$ 791, respectively. The training device may update the parameters of the feature extraction model 710, the warping model 720, and the image restoration model 740 such that the loss to be calculated based on Equation 13 is reduced. For example, the training device may minimize the total loss by updating a parameter of each model. For another example, the training device may repeatedly perform the training until the total loss becomes less than or equal to a threshold loss value by updating a parameter of each model, and complete the training when the total loss is less than or equal to the threshold loss value. Here, by the losses based on Equations 10 through 13 above, the training device may train the models such that viewpoint images are aligned without a camera parameter and a ground truth value of a depth value.

When the training is completed, the convolutional layer for transforming the temporary warped feature maps 702 into the low-resolution warped images 703 may be removed.

Figure 8:
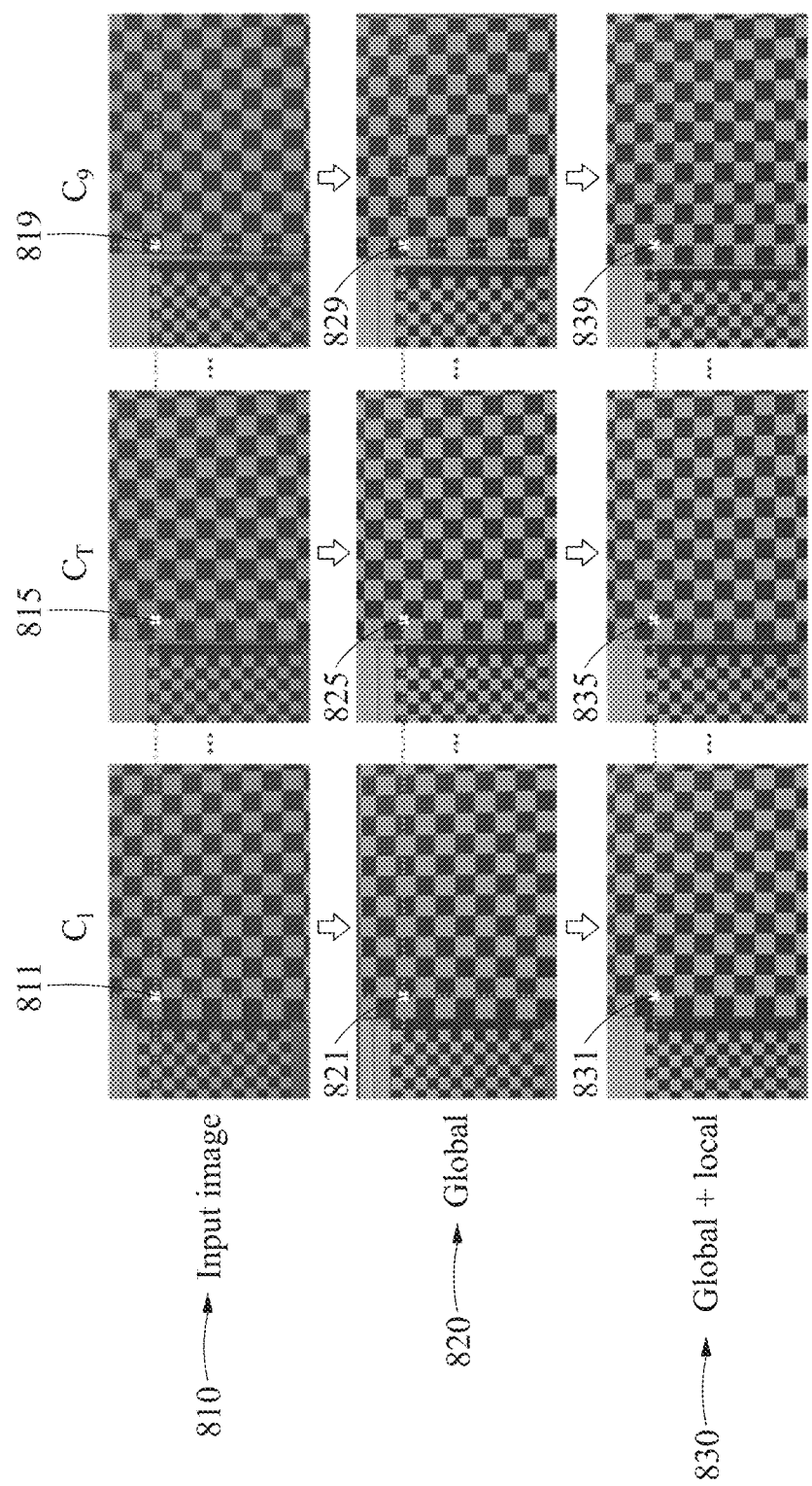
FIG. 8 illustrates examples of a result of image restoration according to an example embodiment.

FIG. 8 illustrates examples of a result of image restoration according to an example embodiment. FIG. 8 shows input images 810, globally transformed images 820, and images 830 obtained through disparity correction.

Referring to FIG. 8, there may be a misalignment between input images 810, for example, viewpoint images, due to a disparity between sensing units. For example, as illustrated, a point 815 on a chessboard pattern in an image captured by a target sensing unit $C_T$ is a corner of a rectangular space. In this example, points 811 and 819 of a same pixel coordinate in images captured by a first sensing unit $C_1$ and a ninth sensing unit $C_9$ are different points on the chessboard pattern.

After the input images 810 are transformed to the globally transformed images 820, a difference between a point 825 in an image captured by the target sensing unit $C_T$ and points 821 and 829 of a same pixel coordinate in images captured by the first sensing unit $C_1$ and the ninth sensing unit $C_9$ is reduced, but not eliminated, compared to that in the input images 810.

In images 830 obtained through disparity correction in addition to the global transformation, a point 835 in an image captured by the target sensing unit $C_T$ and points 831 and 839 of a same pixel coordinate in images captured by the first sensing unit $C_1$ and the ninth sensing unit $C_9$ are matched. In other words, the remaining difference present in the globally transformed images 820 is eliminated by disparity correction. Although images are illustrated in FIG. 8 for the convenience of description, points of feature maps may be matched for each viewpoint in the examples described above with reference to FIGS. 1 through 7.

For example, when the global transformation is applied without the disparity correction, results of image restoration show that a peak signal-to-noise ratio (PSNR) is 37.88 decibels (dB) and a structural similarity (SSIM) is 0.9721. When the disparity correction is applied without the global transformation, results of image restoration show that PSNR=39.50 dB and SSIM=0.9794. However, when both the global transformation and the disparity correction are applied to image restoration using models trained without a geometric consistency loss, results of image restoration show that PSNR=39.37 dB and SSIM=0.9790. When both the global transformation and the disparity correction are applied to image restoration using models trained with a geometric consistency loss, results of image restoration show that PSNR=39.67 dB and SSIM=0.9803. Compared to results of image restoration with residual channel attention networks (RCAN) showing that PSNR=37.34 dB and SSIM=0.9731, and results of video restoration with enhanced deformable convolutional networks (EDVR) showing that PSNR=36.66 dB and SSIM=0.9668, the image restoration method described herein may restore a clearer and higher-resolution image.

Figure 9:
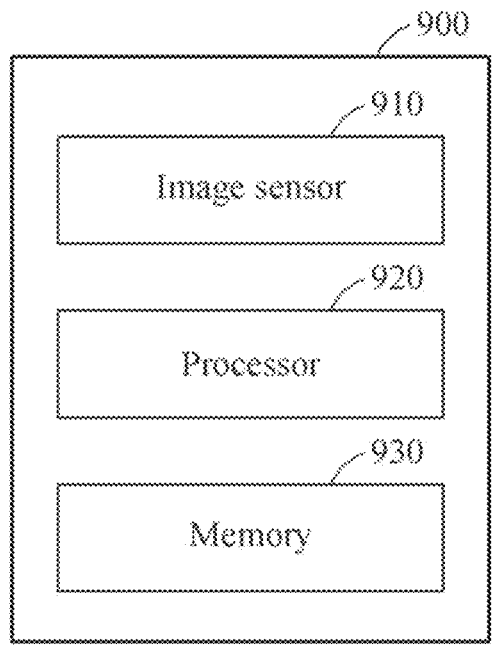
FIG. 9 illustrates an example of an image restoration device according to an example embodiment.

FIG. 9 illustrates an example of an image restoration device according to an example embodiment.

Referring to FIG. 9, an image restoration device 900 includes an image sensor 910, a processor 920, and a memory 930. However, the image restoration device 900 is not limited to the foregoing, and may be integrated into an image sensor or embodied by an imaging device including a lens array and an image sensor.

The image sensor 910 may obtain a plurality of sets of input image information. The image sensor 910 may obtain, as the sets of input image information, a plurality of viewpoint images captured through lenses arranged at different positions. The image sensor 910 may include sensing units configured to respectively obtain the sets of input image information. For example, the image sensor 910 may include N sensing units to obtain N sets of input image information. For example, the image sensor 910 including an MLA may capture a multi-lens image including a plurality of viewpoint images respectively corresponding to a plurality of viewpoints. The processor 920 may generate input data from the multi-lens image captured by the image sensor 910. However, examples are not limited to the foregoing example that the single image sensor 910 includes the N sensing units, but each of N image sensors may include a single sensing unit. In such a case, each of the image sensors may capture a viewpoint image, and the processor 920 may generate input data from the captured viewpoint image. The image sensors may be embodied in a single device. However, examples are not limited to the foregoing, and the image sensors may be respectively provided in independently movable devices, for example, drones.

The processor 920 may obtain the input data including the input image information for each of the viewpoints. The processor 920 may estimate a global transformation parameter of each of the viewpoints from the obtained input data. The processor 920 may estimate disparity information of each of the viewpoints from the obtained input data. The processor 920 may generate warped image information for each of the viewpoints by warping the input image information using the global transformation parameter and the disparity information. The processor 920 may generate an output image for the viewpoints from the generated warped image information, using an image restoration model. The processor 920 may generate the output image, without sensing a depth to a target point corresponding to each pixel. The output image may have a target resolution that is greater than a resolution of each of the individual viewpoint images. For example, the target resolution may be greater than or equal to a resolution that is obtained by adding up all resolutions of the individual viewpoint images. However, the target resolution is not limited to the foregoing example, and may be less than or equal to the resolution that is obtained by adding all the resolutions of the viewpoint images.

The processor 920 is not limited to the operations described in the foregoing, but may perform simultaneously or sequentially one or more, or all of, the operations and methods described above with reference to FIGS. 1 through 8.

Cameras having different capturing directions and capturing positions may capture different scenes. For example, when CNN-based image restoration, for example, an RCAN, is performed on sets of viewpoint image information that are not aligned, an artifact may occur in a restored image. According to an example embodiment, the image restoration device 900 may restore an image based on a non-alignment of viewpoint images. Regions in an image may have different depths, and thus there may be a disparity for each of the regions in the image. Thus, a global transformation based on a single depth may not enable an accurate image alignment. The processor 920 may use the estimated disparity information in addition to the estimated global transformation parameter.

The memory 930 may temporarily or permanently store data required for performing the image restoration method described herein. For example, the memory 930 may store the viewpoint images, the input image information, the warped image information, and the output image. In addition, the memory 930 may store a feature extraction model and its parameters, a warping model and its parameters, and an image restoration model and its parameters. The parameters of each model may be trained in advance. As described above, the image restoration model may be a neural network including at least one convolutional layer that applies convolution filtering to input data, and a parameter of the model may be a connection weight.

Figure 10:
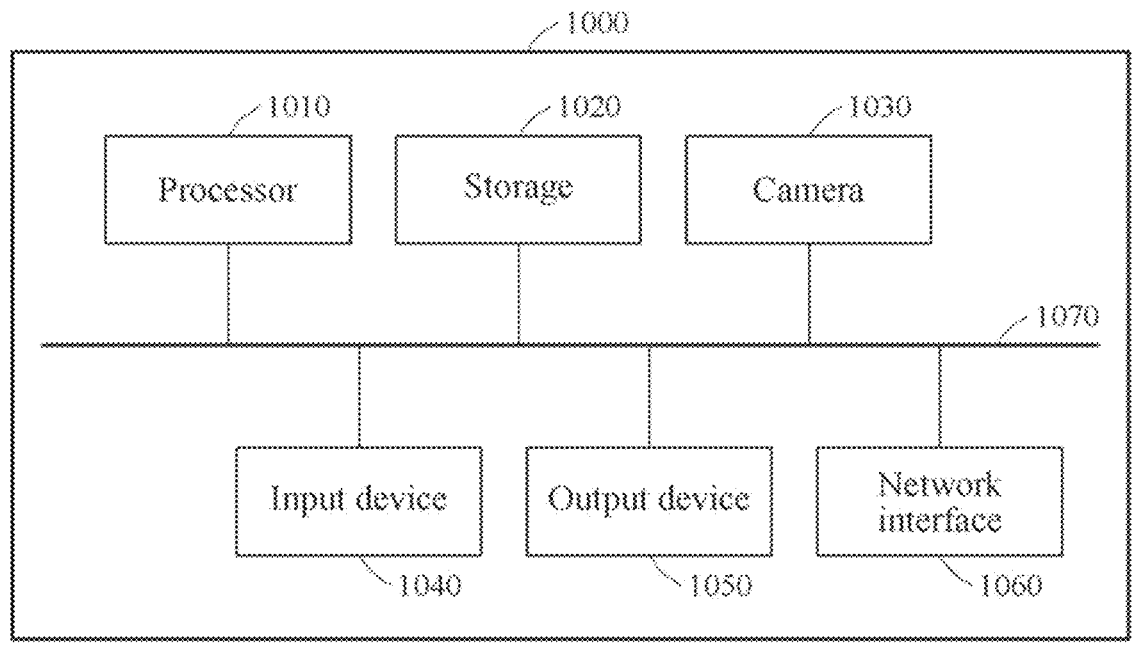
FIG. 10 illustrates an example of a computing device according to an example embodiment.

FIG. 10 illustrates an example of a computing device according to an example embodiment.

A computing device 1000 may be a device configured to generate a high-resolution image using the image restoration method described above. According to an example embodiment, the computing device 1000 may correspond to the image restoration device 900 described above with reference to FIG. 9. The computing device 1000 may be a mobile terminal, for example, an image processing device, a smartphone, a wearable device, a tablet computer, a netbook, a laptop, a desktop, a personal digital assistant (PDA), a head-mounted display (HMD), a camera device, and the like. The computing device 1000 may also be embodied by a vision camera device provided in, for example, a vehicle, a drone, a closed-circuit television (CCTV), and the like. In addition, the computing device 1000 may be embodied by, for example, a webcam device for a video call, a virtual reality (VR) camera device for capturing a 360 degree (°) image, a VR and augmented reality (AR) camera device, and the like.

Referring to FIG. 10, the computing device 1000 includes a processor 1010, a storage 1020, a camera 1030, an input device 1040, an output device 1050, and a network interface 1060. The processor 1010, the storage 1020, the camera 1030, the input device 1040, the output device 1050, and the network interface 1060 may communicate with one another through a communication bus 1070.

The processor 1010 may execute functions and instructions in the computing device 1000. For example, the processor 1010 may process instructions stored in the storage 1020. The processor 1010 may perform one or more, or all, of operations described above with reference to FIGS. 1 through 9.

The storage 1020 may store information or data needed for the processor 1010 to process. The storage 1020 may include a non-transitory computer-readable storage medium or device. The storage 1020 may store instructions to be executed by the processor 1010, and store related information while software or an application is being executed by the computing device 1000.

The camera 1030 may capture a plurality of input images. Although a still image is used herein to refer to an image, an image is not limited to the still image. The camera 1030 may capture a plurality of images each including one or more image frames. For example, the camera 1030 may generate a frame image corresponding to each of a plurality of lenses. In this example, the computing device 1000 may generate a high-resolution output image of each frame from a plurality of input images respectively corresponding to individual frames, using a feature extraction model, a warping model, and an image restoration model that are described above.

The input device 1040 may receive an input from a user through a tactile input, a video input, an audio input, or a touch input. The input device 1040 may include, for example, a keyboard, a mouse, a touchscreen, a microphone, and other devices that may detect the input from the user and transmit the detected input.

The output device 1050 may provide an output of the computing device 1000 to a user through a visual, auditory, or tactile channel. The output device 1050 may include, for example, a display, a touchscreen, a speaker, a vibration generator, and other devices that may provide the user with the output. The network device 1060 may communicate with an external device through a wired or wireless network. According to an example embodiment, the output device 1050 may provide the user with a result obtained by processing data using at least one of visual information, auditory information, or haptic information. For example, the computing device 1000 may visualize a generated high-resolution output image through a display.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While this disclosure includes specific examples, it will be apparent to one of ordinary skill in the art that various changes in form and details may be made in these examples without departing from the scope of the claims and their equivalents.

What is claimed is:

1. An image restoration method comprising:
    obtaining input data comprising respective input image information for each of a plurality of viewpoints;
    estimating a respective global transformation parameter of each of the plurality of viewpoints based on the obtained input data;
    estimating respective disparity information of each of the plurality of viewpoints based on the obtained input data;
    generating respective warped image information for each of the plurality of viewpoints by warping the respective input image information using the respective global transformation parameter and the respective disparity information; and
    generating, using an image restoration model, an output image from the generated respective warped image information for each of the plurality of viewpoints,
    wherein the estimating the respective global transformation parameter comprises:
        obtaining information in which a spatial dimension component is removed from the input data through a global pooling operation; and
        obtaining the respective global transformation parameter based on the information in which the spatial dimension component is removed.

2. The image restoration method of claim 1, wherein the obtaining the input data comprises:
    capturing a plurality of viewpoint images through a plurality of lenses arranged at different positions; and obtaining the respective input image information for each of the plurality of viewpoints from the captured plurality of viewpoint images.

3. The image restoration method of claim 2, wherein a resolution of the output image is greater than a respective resolution of each of the plurality of viewpoint images.

4. The image restoration method of claim 1, wherein the generating the respective warped image information for each of the plurality of viewpoints comprises:
generating respective transformed image information by transforming the respective input image information into a pixel coordinate system of target image information corresponding to a target viewpoint, using the respective global transformation parameter; and
generating the respective warped image information by correcting a disparity of the generated respective transformed image information with respect to the target image information, using the respective disparity information.

5. The image restoration method of claim 4, wherein the transforming using the respective global transformation parameter comprises:
warping all pixels of the respective input image information to the pixel coordinate system of the target image information, using a single depth corresponding to a reference disparity.

6. The image restoration method of claim 5, wherein the warping comprises:
obtaining a coordinate in the respective input image information corresponding to a position in the pixel coordinate system of the target image information, using the respective global transformation parameter;
obtaining a pixel value of the obtained coordinate in the respective input image information; and
setting a pixel value of the position in the respective transformed image information equal to the obtained pixel value.

7. The image restoration method of claim 1, wherein the obtaining the respective global transformation parameter comprises:
applying, to the information in which the spatial dimension component is removed, an operation associated with at least one fully-connected layer of a convolutional neural network.

8. The image restoration method of claim 1, wherein the estimating the respective disparity information comprises:
for each pixel of a plurality of pixels in the respective viewpoint, estimating respective pixel disparity information by performing at least one convolution filtering on feature data extracted from the input data.

9. The image restoration method of claim 8, wherein the estimating the respective pixel disparity information comprises:
obtaining the respective pixel disparity information with a resolution identical to a resolution of the input data.

10. The image restoration method of claim 1, wherein the image restoration model comprises a neural network including at least one convolutional layer that applies convolution filtering to the input data.

11. The image restoration method of claim 1, wherein the input data comprises a plurality of pixels, and
wherein the generating of the output image comprises generating the output image without sensing a depth to a respective target point corresponding to each of the plurality of pixels.

12. The image restoration method of claim 1, wherein the obtaining the input data comprises:
capturing a multi-lens image comprising a plurality of viewpoint images by an image sensor comprising a multi-lens array; and
generating the input data from the captured multi-lens image.

13. The image restoration method of claim 1, wherein the obtaining the input data comprises:
capturing a plurality of viewpoint images, each of the plurality of viewpoint images being captured by a respective image sensor of a plurality of image sensors; and
generating the input data from the captured plurality of viewpoint images.

14. A non-transitory computer-readable storage medium storing instructions that are executable by a processor to perform the image restoration method of claim 1.

15. An image restoration method comprising:
obtaining input data comprising respective input image information for each of a plurality of viewpoints;
estimating a respective global transformation parameter of each of the plurality of viewpoints based on the obtained input data;
estimating respective disparity information of each of the plurality of viewpoints based on the obtained input data;
generating respective warped image information for each of the plurality of viewpoints by warping the respective input image information using the respective global transformation parameter and the respective disparity information; and
generating, using an image restoration model, an output image from the generated respective warped image information for each of the plurality of viewpoints,
wherein the obtaining the input data comprises:
capturing a plurality of viewpoint images through a plurality of lenses arranged at different positions; and
obtaining the respective input image information for each of the plurality of viewpoints from the captured plurality of viewpoint images, and
wherein the obtaining the respective input image information for each of the plurality of viewpoints comprises:
extracting, as the respective input image information, a respective input feature map from each of the plurality of viewpoint images using a feature extraction model.

16. An image restoration method comprising:
obtaining input data comprising respective input image information for each of a plurality of viewpoints;
estimating a respective global transformation parameter of each of the plurality of viewpoints based on the obtained input data;
estimating respective disparity information of each of the plurality of viewpoints based on the obtained input data;
generating respective warped image information for each of the plurality of viewpoints by warping the respective input image information using the respective global transformation parameter and the respective disparity information; and
generating, using an image restoration model, an output image from the generated respective warped image information for each of the plurality of viewpoints, wherein the obtaining the input data comprises:
  capturing a plurality of viewpoint images through a plurality of lenses arranged at different positions; and
  obtaining the respective input image information for each of the plurality of viewpoints from the captured plurality of viewpoint images, and
wherein the generating the respective warped image information comprises:
  generating a warped feature map by warping a feature map extracted from each of the plurality of viewpoint images.

17. An image restoration method comprising:
obtaining input data comprising respective input image information for each of a plurality of viewpoints;
estimating a respective global transformation parameter of each of the plurality of viewpoints based on the obtained input data;
estimating respective disparity information of each of the plurality of viewpoints based on the obtained input data;
generating respective warped image information for each of the plurality of viewpoints by warping the respective input image information using the respective global transformation parameter and the respective disparity information; and
generating, using an image restoration model, an output image from the generated respective warped image information for each of the plurality of viewpoints,
wherein the generating the output image comprises:
  generating image information realigned by a single viewpoint by performing a pixel shuffle on pixels included in the respective warped image information; and
  generating the output image having a target resolution by applying the image restoration model to the generated realigned image information.

18. An image restoration device comprising:
a memory configured to store therein an image restoration model; and
a processor configured to:
  obtain input data comprising respective input image information for each of a plurality of viewpoints,
  estimate a respective global transformation parameter of each of the plurality of viewpoints based on the obtained input data,
  estimate respective disparity information of each of the plurality of viewpoints based on the obtained input data,
  generate respective warped image information for each of the plurality of viewpoints by warping the respective input image information using the respective global transformation parameter and the respective disparity information, and
  generate, using the image restoration model, an output image from the generated respective warped image information for each of the plurality of viewpoints,
wherein the processor is further configured to estimate the respective global transformation parameter of each of the plurality of viewpoints by:
  obtaining information in which a spatial dimension component is removed from the input data through a global pooling operation; and
  obtaining the respective global transformation parameter based on the information in which the spatial dimension component is removed.

* * * * *